Figure 3:
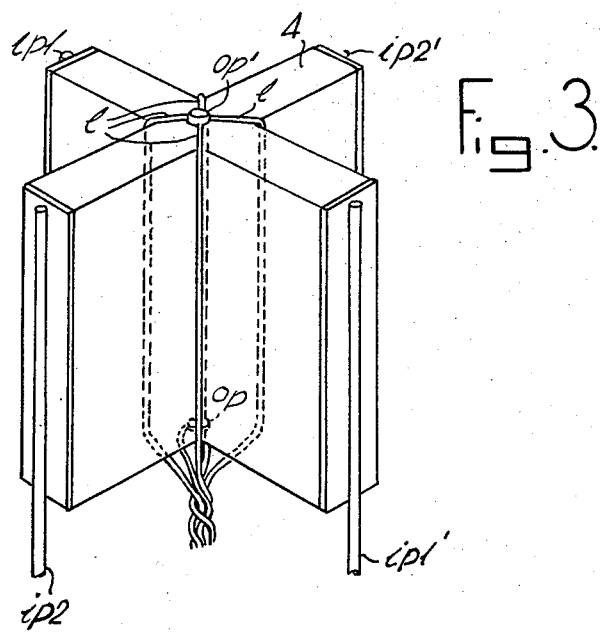

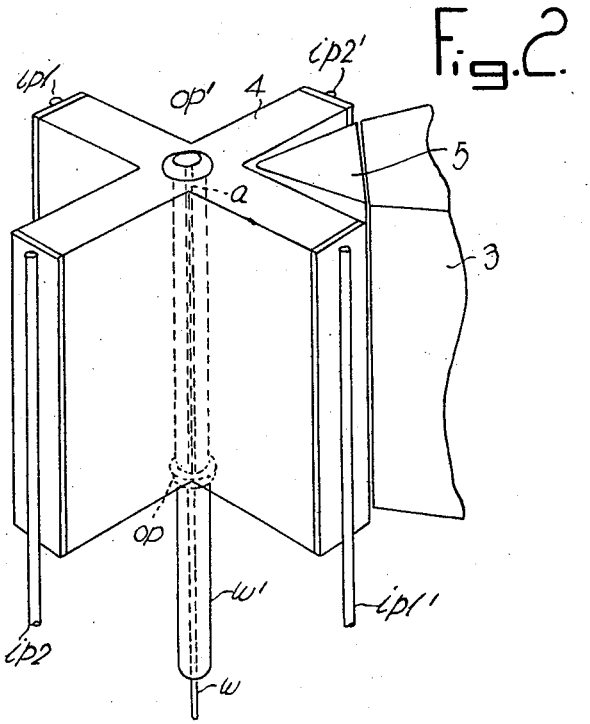
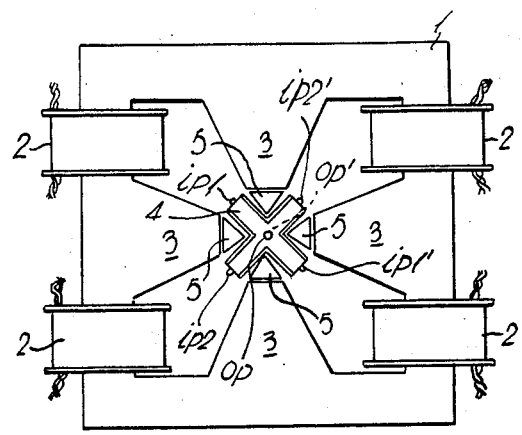

United States Patent Office 3,189,762
Patented June 15, 1965

3,189,762
HALL EFFECT APPARATUS
Robert Keith Portway Galpin, London, England, assignor to Associated Electrical Industries Limited, London, England, a British company
Filed Mar. 19, 1963, Ser. No. 266,400
Claims priority, application Great Britain, Mar. 22, 1962, 1,158/62
6 Claims. (Cl. 307—88.5)

This invention relates to Hall effect apparatus and is an improvement in or modification of the invention set forth in our copending application Serial No. 243,550.

According to the invention of our said copending application, there is provided a compact Hall effect apparatus comprising a magnetizing structure energizable to produce in a region bounded by the structure two intersecting magnetic fields substantially perpendicular to each other, together with a Hall effect prism located in said region for subjection to said intersecting magnetic fields and having two pairs of input electrodes lying on respective lines normal to each other in a plane through said region, and a pair of output electrodes lying along a line transverse to said plane.

In certain examples of such apparatus which are given in our said copending application the magnetizing structure is in the form of a magnetic body having two pairs of salient pole-pieces disposed on lines normal to each other with the pole-pieces of each pair extending inwardly towards but terminating short of each other, the region in which the Hall effect prism is located being bounded by the inner ends of these pole-pieces. The Hall effect prism is a cube and as such gives rise to the disadvantage that the efficiency of the apparatus may be limited in view of the large air gap which is needed in the magnetizing structure to accommodate the cube. There also exists the problem of feeding input current to the Hall effect cube prism efficiently. This latter problem is one of compromise because it involves providing input electrodes which are large enough to avoid high current concentrations in the prism in the vicinity of these electrodes, but which are not large enough to act as shunts permitting flow of input current between electrodes of different pairs rather than between electrodes of the same pair as is required. A further problem is the determination of an optimum size for the output voltage electrodes.

With a view to overcoming these problems the present invention provides a Hall effect apparatus having a magnetizing structure of the above form and in which the Hall effect prism is of cruciform cross-section having two pairs of electrodes respectively located at or adjacent the outer ends of opposite limbs of the prism and a further pair of electrodes located on opposite surfaces of the prism at the intersection of the limbs.

With a Hall effect prism of cruciform cross-section the magnetizing structure of the apparatus can have its pole-pieces extending into the areas between adjacent limbs of the prism. Thus the air gap between the pole-pieces can now be significantly smaller than the air gap which is required when the prism is cube-shaped so that the magnetic circuit of the structure is improved. Also, the distribution of current in the prism is improved, having now a substantially linear distribution between pairs of opposite limbs. This permits the use of a relatively large area, low-resistance contact as an input contact at the outer end of each limb, with little danger of input current applied at one contact being shunted by the contact on an adjacent limb. Therefore, for a given magnitude of electric and magnetic input to the Hall effect apparatus these two improvements provide an increased flux density and current concentration in the region of the prism between electrodes serving as output electrodes: thus as the Hall voltage output at such electrodes is directly proportional to the product of the flux density and current magnitude in this region, the efficiency of the apparatus is improved.

In order that the invention may be more fully understood reference will now be made by way of example to the accompanying drawings, in which—

Figure 4:
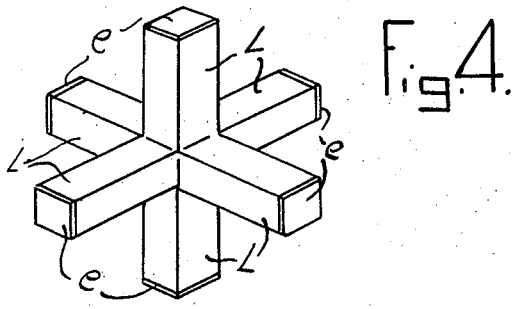

FIG. 1 illustrates diagrammatically a Hall effect apparatus having, in conformity with the invention, a Hall effect prism of cruciform cross-section, FIGS. 2 and 3 are respective enlarged views of a Hall effect prism of cruciform cross-section showing alternative ways of minimizing at its output electrodes any magnetic leak component arising from alternating current input, and FIG. 4 shows an alternative form of Hall effect prism.

Referring to FIG. 1, the Hall effect apparatus there shown comprises as its magnetizing structure a rectangular magnetic body 1 carrying magnetizing coils 2. This magnetizing body 1, which is assumed to be of the form illustrated in FIGS. 6 and 11 of our said copending application, has inwardly extending pole-pieces 3 serving to concentrate a rotating magnetic field produced on energization of the coils 2 towards a Hall effect prism 4 of cruciform cross-section. In order to concentrate the rotating magnetic field at the centre of the prism 4, the pole-pieces 3 have respective end pole-shoes 5 which seat in the areas between adjacent limbs of the prism 4. Instead of having such pole-shoes associated therewith, the pole-pieces may be shaped so as themselves to extend into these areas. Input electrodes $ip1$, $ip1'$ and $ip2$, $ip2'$ are attached to the ends of diagonally opposite limbs of the prism 4, while output electrodes $op$, $op'$ (the latter not seen in the drawing) are attached at the centre of the prism 4 to opposite surfaces which lie normal to the input electrodes.

Where separate end pole-shoes are provided for the pole-pieces of such a magnetic body, the Hall effect prism of cruciform cross-section with these pole-shoes in situ in the areas between its adjacent limbs may be embedded in a suitable protective material so as to form an encapsulated unit which is insertable into the magnetic body. Connecting wires would, of course, be attached to the input and output electrodes prior to encapsulation.

Turning now to FIGS. 2 and 3, in each of which there is shown an enlarged perspective view of the Hall effect prism 4, any leak component of the magnetic input appearing at the output electrodes $op$, $op'$ may be minimized by providing output connections as shown in each of these figures. With the output connections of FIG. 2, for which the prism 4 is provided with a small aperture $a$ which extends between the output electrodes $op$, $op'$, an output conductor $w$ is threaded through the aperture $a$ and connected to the output electrode $op'$, this conductor passing through, but being insulated from, the other output electrode $op$ which is in the form of a ring surrounding the aperture $a$, while a second output conductor $w'$ is connected to the ring electrode $op$. Preferably the conductor $w'$ is in the form of a sheath which surrounds the conductor $w$ external to the prism 4. In this way, the conductor $w$ is screened at first by the prism 4 and then by the sheath conductor $w'$, so that any signal induced therein from the magnetic input can be expected to be small. These output connections correspond to those shown in FIG. 9 of our said copending application.

In contrast to the output connections shown in FIG. 2, which aim at keeping the E.M.F. induced in to the conductor $w$ to a minimum, the output connections shown in FIG. 3 aim at balancing out the induced E.M.F. by arranging the conductor connected to contact $op'$ as four wires *l* which are located in respective corners at the centre of the prism 4 and define twin loops in which the E.M.F. is induced in opposite senses. These latter output connections correspond to those shown in FIG. 10 of our said copending application.

Although not shown in the drawing, current input leak may be minimized by having a first variable potentiometer connected across the input electrodes *ip*1, *ip*1' in respect of one in-quadrature phase of applied signal current, and a second variable potentiometer connected across the input electrodes *ip*2, *ip*2' in respect of the other in-quadrature phase of applied signal current, the adjustable taps of these two resistances being connected in common to one of the output electrodes *op* or *op*'. This method of minimizing current input leak is shown in FIG. 8 of our said copending application.

For the Hall effect apparatus just described the Hall effect prism thereof has input and output electrodes appropriate for use of the apparatus for modulation purposes, for example in the manner described in our copending application Serial No. 160,746. However, it is to be appreciated that the apparatus could also be used for demodulation purposes, for example in the manner also described in our copending application Serial No. 160,746, by replacing the existing output voltage electrodes with current input electrodes and vice versa, with the result that quadrature Hall output voltages can be obtained from the two pairs of output voltage electrodes now provided.

However where the Hall effect apparatus may be required to be used either for modulation or demodulation the Hall effect prism thereof should, ideally, be symmetrical in all three dimensions in order to minimize any disturbance of the current between input electrodes by the output voltage electrodes. Accordingly the prism of cruciform cross-section may take the form shown in FIG. 4, the prism shown in this figure having three mutually perpendicular pairs of mutually aligned limbs L with an electrode *e* at or adjacent the outer end of each limb. Such a prism is fully symmetrical and the electrodes *e* of any pair of limbs may serve as voltage output or current input electrodes as required.

What I claim is:

1. Hall effect apparatus comprising a magnetizing structure energizable to produce in a region bounded by the structure two intersecting magnetic fields substantially perpendicular to each other, which structure has two pairs of salient pole-pieces disposed on lines normal to each other with the pole-pieces of each pair extending inwardly towards but terminating short of each other with their inner ends bounding said region, together with a Hall effect prism of cruciform cross-section located in said region and having two pairs of electrodes respectively located at the outer ends of opposite limbs of the prism and a further pair of electrodes located on opposite surfaces of the prism at intersection of the limbs.

2. Apparatus as claimed in claim 1 in which the pole-pieces penetrate the areas between adjacent limbs of the cruciform prism.

3. Apparatus as claimed in claim 2 wherein end portions of the pole-pieces within said areas are formed as pole-shoes separately from the remainder of the magnetizing structure.

4. Apparatus as claimed in claim 3 wherein the prism with said pole-shoes in situ in said areas are embedded in a protective material as an encapsulated unit.

5. Apparatus as claimed in claim 1 wherein, with said two pairs of electrodes constituting current input electrodes and said further pair of electrodes constituting voltagt output electrodes, the Hall effect prism is formed with an aperture which extends between the output electrodes, one of the output electrodes has connected to it a first output conductor which extends through the aperture, the other output electrode is in the form of a ring surrounding the aperture and has connected to it another output conductor in the form of a sheath surrounding the first conductor externally of the prism.

6. Apparatus as claimed in claim 1 wherein with said two pairs of electrodes constituting current input electrodes and said further pair of electrodes constituting voltage output electrodes, one of said output electrodes has connected to it as an output conductor two wire loops which are located respectively in diametrically opposed corners at the centre of the prism.

No references cited.

JOHN W. HUCKERT, *Primary Examiner.*

ARTHUR GAUSS, *Examiner.*